(12) United States Patent
Kawasaki et al.

(10) Patent No.: US 6,439,638 B1
(45) Date of Patent: Aug. 27, 2002

(54) VEHICLE SUN VISOR

(75) Inventors: Teruo Kawasaki; Yoshiaki Kazama; Tomoko Furuhashi, all of Kanagawa-ken (JP)

(73) Assignee: Kasai Kogyo Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/639,173

(22) Filed: Aug. 16, 2000

(30) Foreign Application Priority Data

| Aug. 20, 1999 | (JP) | 11-233649 |
| Aug. 20, 1999 | (JP) | 11-234561 |
| Aug. 3, 2000 | (JP) | 2000-236198 |

(51) Int. Cl.[7] .................................................. B60J 3/00
(52) U.S. Cl. ...................... 296/97.2; 296/97.3; 296/97.4
(58) Field of Search .............................. 296/97.2, 97.3, 296/97.4, 97.8

(56) References Cited

U.S. PATENT DOCUMENTS

| 1,589,475 A | * | 6/1926 | Lowther | 296/97.3 |
| 1,597,084 A | * | 8/1926 | Lowther et al. | 296/97.3 |
| 2,422,863 A | * | 6/1947 | Stroth | 296/97.8 |
| 2,498,966 A | * | 2/1950 | Sauer | 296/97.4 |
| 2,744,783 A | * | 5/1956 | Peavey | 296/97.3 |
| 4,280,730 A | * | 7/1981 | Turner | 2996/97.8 |
| 4,362,330 A | * | 12/1982 | Cramer | 296/97.3 |
| 4,726,620 A | * | 2/1988 | Takahashi | 296/97.3 |

* cited by examiner

Primary Examiner—Stephen T. Gordon
Assistant Examiner—Lori L Coletta
(74) Attorney, Agent, or Firm—Foley & Lardner

(57) ABSTRACT

A sun visor to be used in a vehicle has a sun visor body with an opening; at least one punched plate having a front side and a back side and a plurality of holes opened between the front side and the back side, which is fitted in the opening of the sun visor body; and at least one light-attenuation plate for attenuating incident light horizontally passing through the holes of the punched plate, which is placed on at least one of the front and back sides of the punched plate. Therefore, the vehicle can be operated safely under the incident morning or evening sunlight.

16 Claims, 12 Drawing Sheets

FIG.5

| TYPE | t (mm) | φ (mm) | VALUATION | φ／t |
|---|---|---|---|---|
| A | 1.0 | 0.4 | × | 0.4 |
| B | 2.0 | 0.6 | × | 0.3 |
| C | 2.0 | 0.8 | ○ | 0.4 |
| D | 2.0 | 1.0 | ○ | 0.5 |
| E | 3.0 | 0.9 | × | 0.3 |
| F | 3.0 | 1.2 | ○ | 0.4 |
| G | 3.0 | 2.4 | ○ | 0.8 |
| H | 4.0 | 0.8 | × | 0.2 |
| I | 4.0 | 1.6 | ○ | 0.4 |

VEHICLE SUN VISOR

CROSS-REFERENCES TO RELATED APPLICATION

This application claims all benefits accruing under 35 U. S. C. §119 from the Japanese Patent Applications No. 11-233649, filed on Aug. 20, 1999 and No. 11-234561, filed on Aug. 20, 1999 and No. 2000-236198, filed on Aug. 3, 2000.

BACKGROUND OF THE INVENTION

1. Field of the Invention

The present invention relates to a sun visor to be used in a vehicle such as an automobile to shade or protect the eyes from sunlight or the like, which comprises a punched plate that blocks incident light obliquely from above and a light-attenuation plate that attenuates light passing through holes formed on the punching plate.

2. Description of the Related Art

Conventionally, sun visors have been equipped on front windows of vehicles such as automobiles for shading driver's eyes from sunlight or the like incident from the front.

There are two types of the conventional sun visors: one is a non-translucent type for blocking incident sunlight or the like perfectly, and the other is a translucent type for securing a clear view to the front (i.e., the driver's front view) while blocking incident sunlight or the like.

The non-translucent type sun visor has an advantage of perfectly blocking sunlight or the like. However, it is difficult to keep the safe operation of the vehicle as the sun visor restricts the driver's front view.

On the other hand, the translucent-type sun visor comprises a frame formed from a resin material for enclosing a punched plate. The punched plate has a plurality of holes and is colored with black for preventing the reflection of light on its surface. In addition, a mirror is optionally attached on a part of the punched plate.

The translucent-type sun visor using such a punched plate has an advantage of blocking incident light obliquely from above.

In this case, however, light incident laterally from the front (i.e., incident light perpendicular to the surface of the punched plate) passes through the punched plate, so that there is no advantage of shading the driver's eyes from light such as the morning or evening sunlight.

For solving such a problem, for example, Japanese Patent Application Laying-open No. 62-500222 (1987) discloses a vehicle sun visor that allows the adjustment of the amount of incident light to be passed through the sun visor.

In this reference, the sun visor comprises two plates having two different polarizing films aligned alternatively with a predetermined distance. For adjusting the light amounts, two plates are placed one upon another and at least one of them is shifted its position with respected to the other.

Such a mechanism for adjusting the light amounts requires a driving mechanism that includes a motor, a control device for controlling the motor, and so on. Thus, there is another problem that such a sun visor has a complex and expensive configuration.

SUMMARY OF THE INVENTION

It is an object of the present invention is to provide a sun visor to be used in a vehicle such as an automobile to shade or protect the eyes from sunlight or the like, which comprises a punched plate that blocks incident light from the front and a light-attenuation plate that attenuates light passing through holes formed on the punching plate to obtain a clear view to the front and attenuating effects on light incident from the front to reduce glare.

There is provided a vehicle sun visor comprising: a sun visor body having an opening; at least one punched plate having a front side and a back side and a plurality of holes opened between the front side and the back side, which is fitted in the opening of the sun visor body; and at least one light-attenuation plate for attenuating incident light passing through the holes of the punched plate, which is placed on at least one of the front side and the back side of the punched plate.

Therefore, an advantage of the present invention is that sunlight or the like incident obliquely from above cannot pass through the holes of the punched plate. Such light can be effectively prevented without affecting a clear view to the front through the use of both the light-attenuation plate and the holes of the punched plate.

In addition, incident light such as morning or evening sunlight horizontally passing through the punched plate can be attenuated by the light-attenuation plate, so that the incident light introduced into a driver's eye cannot be blinded by the glare.

Here, the light-attenuation plate may be a smoke plate made of a synthetic resin and the smoke plate may be commercially available. Therefore, the sun visor can be easily manufactured at a low cost.

First and second punched plates may be applied on the front and back sides of the light-attenuation plate, respectively, by means of a printing procedure. Therefore, there is no need to prepare punched plates as separate components to be attached on both sides of the light-attenuation plate, so that the number of components and the number of manufacturing steps can be reduced.

The holes of the first punched plate may be displaced from their corresponding holes of the second punched plate in a vertical direction of the sun visor body. By changing the orientation of the sun visor body, therefore, a lateral or angled clear view to the front can be easily obtained by turning the sun visor body.

Two or more punched plates may be stacked on top of each other in layers to form a punched plate assembly and at least one of the punched plates is provided as a movable punched plate that can be shifted its position by a sliding member, and the light-attenuation plate may be provided on at least one side of the punched plate assembly. Therefore, an advantage of the present invention is that sunlight or the like incident obliquely from above cannot pass through the holes of the punched plate, so that such light can be effectively prevented without affecting a clear view to the front view through the use of both the light-attenuation plate and the holes of the punched plate.

In addition, incident light such as morning or evening sunlight laterally passing through the punched plate can be attenuated by the light-attenuation plate, so that the incident light introduced into the driver's eyes is not bright. Furthermore, the movable punched plate can be shifted its position by the sliding member for adjusting the degree of opening the holes or closing the holes perfectly when the intensity of incident light is too high or the front view is not required.

An engaging means may be further comprised in the sun visor for interlocking the movable punched plate on different predetermined positions before and after sliding the movable punched plate, respectively. Therefore, there is no possibility of accidentally moving the movable punched plate by mechanical vibrations or the like to be caused by driving a vehicle, so that the movable punched plate can be kept in place as desired.

A pivoted lid may be further comprised in the sun visor, which may be fixed on the lower part of the sun visor body by means of a hinge so that the pivoted lid is able to turn around the hinge. For extending the shield area of the sun visor body, therefore, the pivoted lid can be extended from the sun visor body by turning around the hinge, so that the sun visor can be functioned as an extension sun visor.

A rod member may be further comprised in the sun visor for attaching the sun visor on a predetermined portion of a vehicle, where the sun visor is able to turn around the rod member. Therefore, the sun visor body can be pivoted around the rod member, so that the sun visor can be easily oriented in position as desired.

The above and other objects, effects, features and advantages of the present invention will become more apparent from the following description of embodiments thereof taken in conjunction with the accompanying drawings.

BRIEF DESCRIPTION OF THE DRAWINGS

FIG. 5 is a table that provides a summary of the relationship between the thickness "t" and the diameter "Φ" of the hole formed on the punched plate of the vehicle sun visor in accordance with the first embodiment of the present invention;

DETAILED DESCRIPTION OF THE INVENTION

Figure 1:
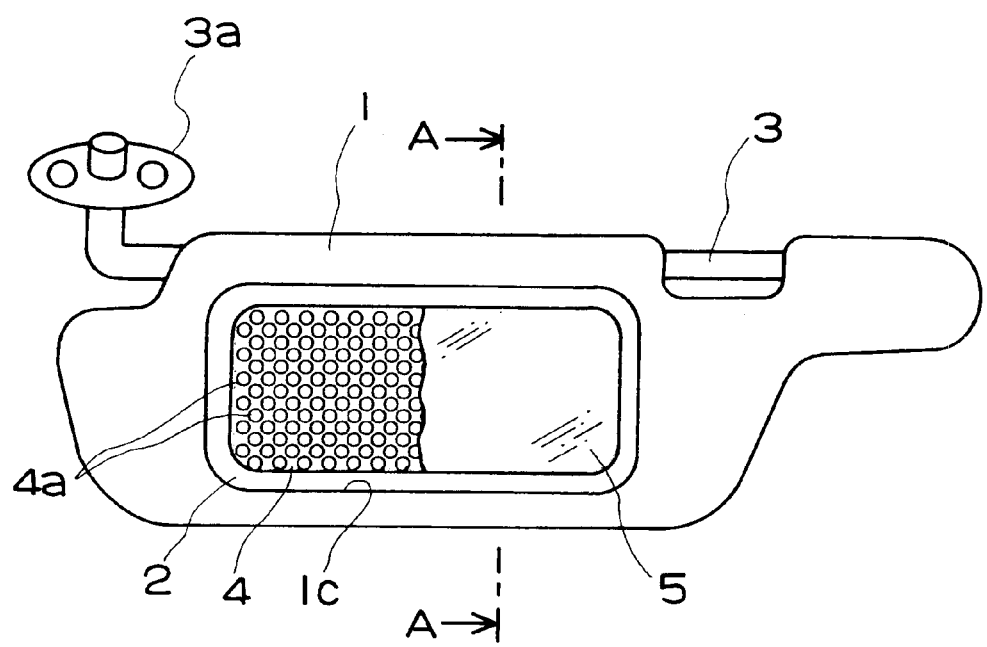
FIG. 1 is a front view of a vehicle sun visor as a first preferred embodiment of the present invention.

Referring now to FIGS. 1 to 4, we will describe a sun visor as a first preferred embodiment of the present invention.

As shown in the figures, the sun visor comprises a sun visor body 1, frame members 2, a rod 3 for hanging and orienting the sun visor body 1, at least one punched plate 4, and at least one light-attenuation plate 5.

The sun visor body 1 comprises a rectangle-shaped core member 1a and a covering material 1b that encloses the core member 1a. In addition, a rectangular opening 1c is formed on the middle of the sun visor body 1.

A pair of the frame members 2 is molded of a resin material or the like. The frame members 2 are fitted in the opening 1c from both sides of the body 1, respectively, and simultaneously the frame member 2 are engaged with each other. By the way, both sides of the sun visor body 1 are defined as one side (i.e., a front side) facing to the front under normal usage and the other side (i.e., a back side) facing to the opposite side.

In addition, a lateral direction of the sun visor or the like corresponds to a direction substantially parallel to a driver's horizontal line of sight with respect to the ground. On the other hand, a vertical direction of the sun visor or the like corresponds to a direction perpendicular to the lateral direction of the sun visor, so that the sun visor is able to pivot or turn vertically around the rod member to orient itself at an appropriate angle with respect to the driver's line of sight.

The rod 3 for hanging and orienting the sun visor body 1 is shaped like the letter "L" and positioned at the top of the sun visor body 1. One end portion of the rod 3 (i.e., a long part of "L" in the figure) passes longitudinally through an upper edge of the sun visor body 1 so that the sun visor body 1 pivots about the rod 3. On the other hand, the other end of the rod 3 (i.e., a short part of "L" in the figure, which is directed upward) is connected to a mounting member 3a. The mounting member 3a is provided for securing the body 1 of the sun visor on the proximity of a roof of the vehicle body (not shown) by screws or the like.

Figure 2:
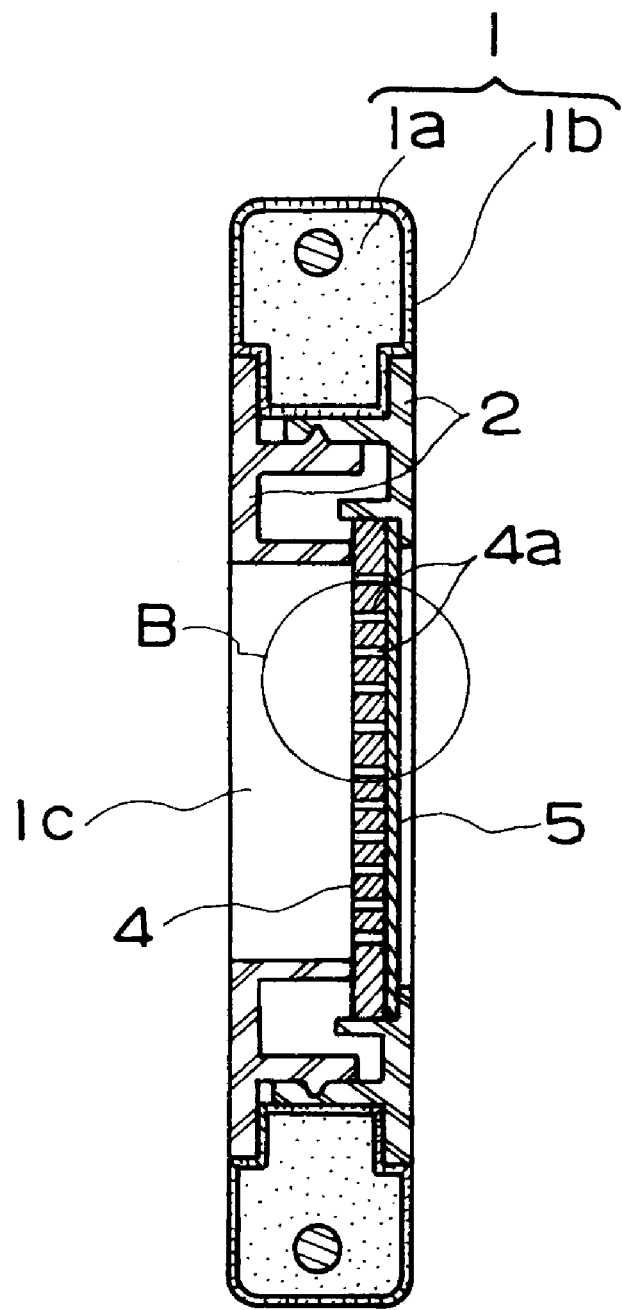
FIG. 2 is a cross sectional view along the line A—A in FIG. 1, showing the vehicle sun visor as the first preferred embodiment of the present invention.
Figure 3:
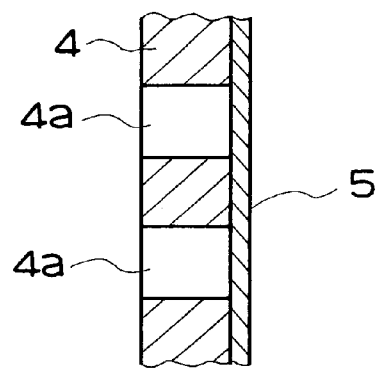
FIG. 3 is an enlarged view of a circled portion "B" in FIG. 2.

FIG. 2 is a cross sectional view along the line A—A in FIG. 1. As shown in FIG. 2, the punched plate 4 and the light-attenuation plate 5 are layered together to make a light-shield assembly and sandwiched between the frame members 2 fitted in the opening 1c of the sun visor body 1. In this embodiment, the light-shield assembly is leaning to one side of the sun visor body 1.

The punched plate 4 is formed by punching a plurality of holes in a metal plate or the like to make a predetermined pattern of holes. Each of the holes is opened perpendicularly to the front and back sides of the punched plate 4. In addition, the thickness of the metal plate, the diameter of each hole, the spacing the adjacent holes, and so on are defined so that incident light obliquely from above can be blocked.

The light-attenuation plate 5 is made of a colored synthetic resin material, which is referred to generally as "a smoke plate" and commercially available. The light-attenuation plate 5 is shaped with the same dimensions as that of the punched plate 4. Furthermore, the light-attenuation plate 5 is placed on the back side (i.e., the driver's side) of the light-shield assembly described above for attenuating light passing through the holes 4a of the punched plate 4.

The percentage of attenuating incident light by the light-attenuation plate 5 (or the light transmittance of the plate 5) is defined for reducing the glare of sunlight so that the incident light to be introduced into driver's eyes is not bright and the driver's front view is not obstructed by the incident light passing through the light-attenuation plate 5.

Then, the usage and the effects of the sun visor described above will be described below.

Figure 4:
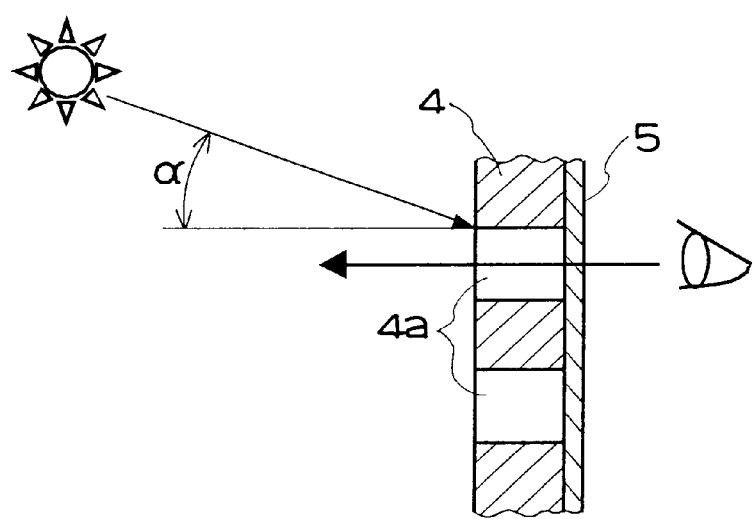
FIG. 4 is a cross sectional view of part of the sun visor for illustrating the mechanism of blocking sunlight incident obliquely from above.

If sunlight or the like incident obliquely from above is introduced into driver's eyes while the driver is driving the car as shown in FIG. 4, the driver may change the orientation of the sun visor body 1 to place its surface of the body 1 substantially in a vertical direction with respect to a driver's horizontal line of sight indicated by the arrow in the figure. Thus, the sunlight or the like incident obliquely from above at an angle of "α" with respect to the line of sight cannot pass through the holes 4a formed on the punched plate 4. That is, the sunlight incident obliquely from above can be effectively blocked while the driver's view toward the front can be ensured. Consequently, the driver is able to drive the car with safety in spite of using the sun visor to shield driver's eyes from sunlight or the like.

In this embodiment, incident light parallel to the driver's line of sight (such as the morning or evening sunlight) passes through the holes 4a of the punched plate 4 under normal use. In this case, however, the light-attenuation plate 5 is layered on the punched plate 4b. Thus, the light-attenuation plate 5 attenuates the incident light before passing through the holes 4a if it is positioned on the front side of the punched plate 4. Alternatively, the light-attenuation plate 5 attenuates the incident light after passing through the holes 4a if it is positioned on the back side of the punched plate 4. Thus, the incident light to be introduced into driver's eyes is not bright and the driver's front view is not obstructed by the incident light passing through the light-attenuation plate 5.

Therefore, the driver can drive the car without any troubles caused by the glare of incident light, so that the driver's view toward the front can be ensured and the driver is able to drive the car with safety in spite of using the sun visor to shield the driver's eyes from sunlight or the like.

Regarding the light-shielding ability and front visibility of the sun visor, as shown in FIG. 5, we prepared nine different types of the sun visors according to the embodiment described above for estimating the relationship between the thickness "t" of the punched plate 4 and the diameter "Φ" of the hole 4a of the punched plate 4 with respect to the incident angle "α" of sunlight. In FIG. 5, furthermore, "a circle mark (O)" means that both a good light-shielding ability and a good front visibility of the sun visor were attained. Also, "a cross mark (X)" means that either a poor light-shielding ability or a poor visibility of the sun visor were attained.

We found that both a good light-shielding ability and a good front visibility were attained when the thickness "t" of the punched plate 4 was 2 mm or over while the diameter "Φ" of the hole 4a satisfied Φ/t=0.4 or over. If the thickness "t" of the punched plate 4 was less than 2 mm while the diameter "Φ" of the hole 4a satisfied Φ/t=0.4 or over as shown in FIG. 5, we found that the driver's front view was obstructed in spite of slightly changing the angle of the sun visor to tilt the sun visor toward the front or rear of the vehicle about the rod 3 depending on a driver's position or physique.

Figure 6:
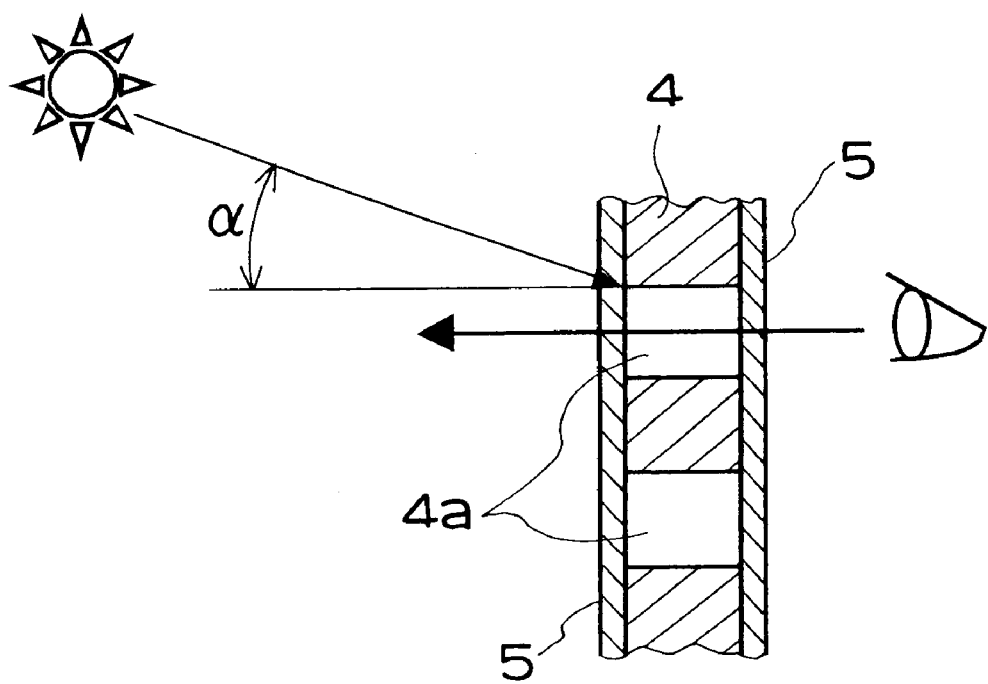
FIG. 6 is a cross sectional view of part of the sun visor for illustrating the mechanism of blocking sunlight incident obliquely from above in accordance with a modification of the first embodiment of the present invention.

In the above embodiment, the light-attenuation plate 5 is placed on the front or back side of the punched plate 4. However, as shown in FIG. 6, two or more light-attenuation plates 5 (e.g., first and second light-attenuation plates 5 in the figure) may be placed on both sides of the punched plate 4, respectively. For preventing excessive light-attenuation, in this case, each of the light-attenuation plates 5 is prepared to have a lower light-attenuation rate, compared with that of the first embodiment.

Figure 7:
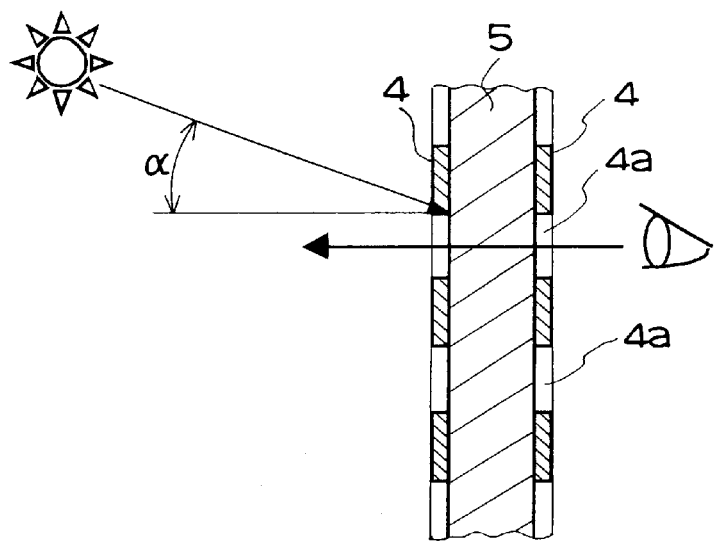
FIG. 7 is a cross sectional view of part of the sun visor for illustrating the mechanism of blocking sunlight incident obliquely from above in accordance with another modification of the first embodiment of the present invention.

As shown in FIG. 7, alternatively, two or more punch plates 4 (e.g., first and second punch plates 4 in the figure) may be placed on both sides of the light-attenuation plate 5. In this case, the light-attenuation plate 5 may be preferably provided as a sturdy plate with a heavy wall thickness. Each of the punched plates 4 may be formed as printed layers applied on both sides of the light-attenuation plate 5 by means of the conventional printing procedure to form a light-shield assembly. In addition, the positions of the corresponding positions of the corresponding holes 4a on both sides of the punched plates 4 may be in proper alignment with each other in a width direction (i.e., a thickness direction) of the light-attenuation plate 5. The sun visor allows a clear view in a direction substantially parallel to the driver's line of sight indicated by the arrow in the figure. Therefore, such a light-shield assembly shields driver's eyes from sunlight or the like incident obliquely from above and attenuates sunlight or the like incident horizontally from the front, resulting in the same light-shielding and light-attenuation effects as those of the embodiment described above.

Figure 8:
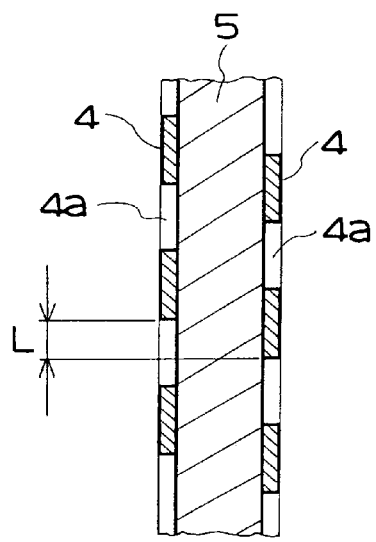
FIG. 8 is a cross sectional view of part of the sun visor in accordance with still another modification of the first embodiment of the present invention.
Figure 9:
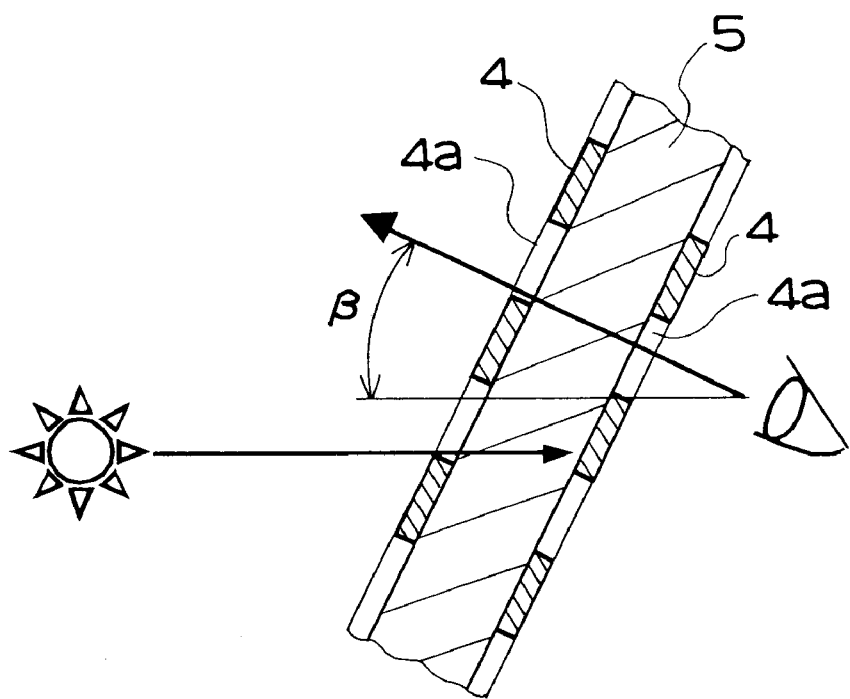
FIG. 9 is a cross sectional view of part of the sun visor of FIG. 8 for illustrating the mechanism of blocking sunlight incident obliquely from below in accordance with another modification of the first embodiment of the present invention.

In FIGS. 8 and 9, furthermore, printed punched plates 4 may be placed on both sides of the light-attenuation plate 5 so that the positions of the corresponding holes 4a on the respective plates 4 may be deviated from each other by a distance "L" in a height direction (i.e., an up-and-down direction) of the sun visor body 1. By tilting the sun visor body 1 about the rod 3, the punched plates 4 shield the driver's eyes from light incident obliquely from above or light incident horizontally from the front. As shown in FIG. 9, the assembly may allow the driver's view toward the front in an upward or downward direction by tilting the sun visor body at an appropriate angle. In this case, furthermore, a range of visual angles "β" with respect to the driver's horizontal line of sight may be optionally defined by changing the diameter of the hole 4a of the punched plate 5 or changing the amount of deviation "L" between the corresponding holes 4a.

As another modification of the first embodiment, each hole 4a may be obliquely formed on the punched plate 4 (this configuration is not shown in the figure), so that sunlight incident obliquely from above at an angle of "α" or over can be blocked by the punched plate 4 if the driver's line of sight may be inclined at a visual angle of "β" with respect to the driver's horizontal line of sight.

Referring now to FIGS. 10 to 13, we will describe a sun visor as a second preferred embodiment of the present invention.

As shown in the figures, the sun visor comprises a sun visor body 1, frame members 2, a rod 3 for hanging and orienting the sun visor body 1, at least one punched plate 4, at least one light-attenuation plate 5, a sliding member 6, and a pivoted lid 7.

The sun visor body 1 comprises a rectangle-shaped core member 1a and a covering material 1b that encloses the core member 1a. In addition, a rectangular opening 1c is formed on the middle of the sun visor body 1.

A pair of the frame members 2 is molded of a resin material or the like. The frame members 2 are fitted in the opening 1c from both sides of the body 1, respectively, and simultaneously the frame member 2 are engaged with each other.

The rod 3 for hanging and orienting the sun visor body 1 is shaped like the letter "L" and positioned at the top of the sun visor body 1. One end portion of the rod 3 (i.e., a long part of "L" in the figure) passes longitudinally through an upper edge of the sun visor body 1 so that the sun visor body 1 pivots about the rod 3. On the other hand, the other end of the rod 3 (i.e., a short part of "L" in the figure, which is directed upward) is connected to a mounting member 3a. The mounting member 3a is provided for securing the body 1 of the sun visor on the proximity of a roof of the vehicle body (not shown) by screws or the like.

Figure 10:
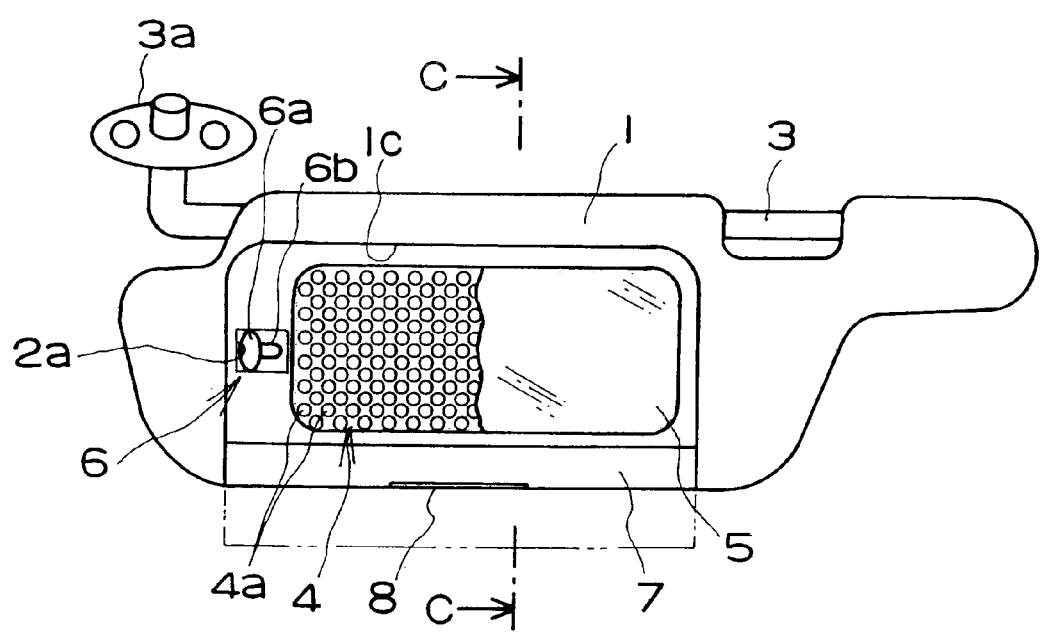
FIG. 10 is a front view of a vehicle sun visor as a second preferred embodiment of the present invention.
Figure 11:
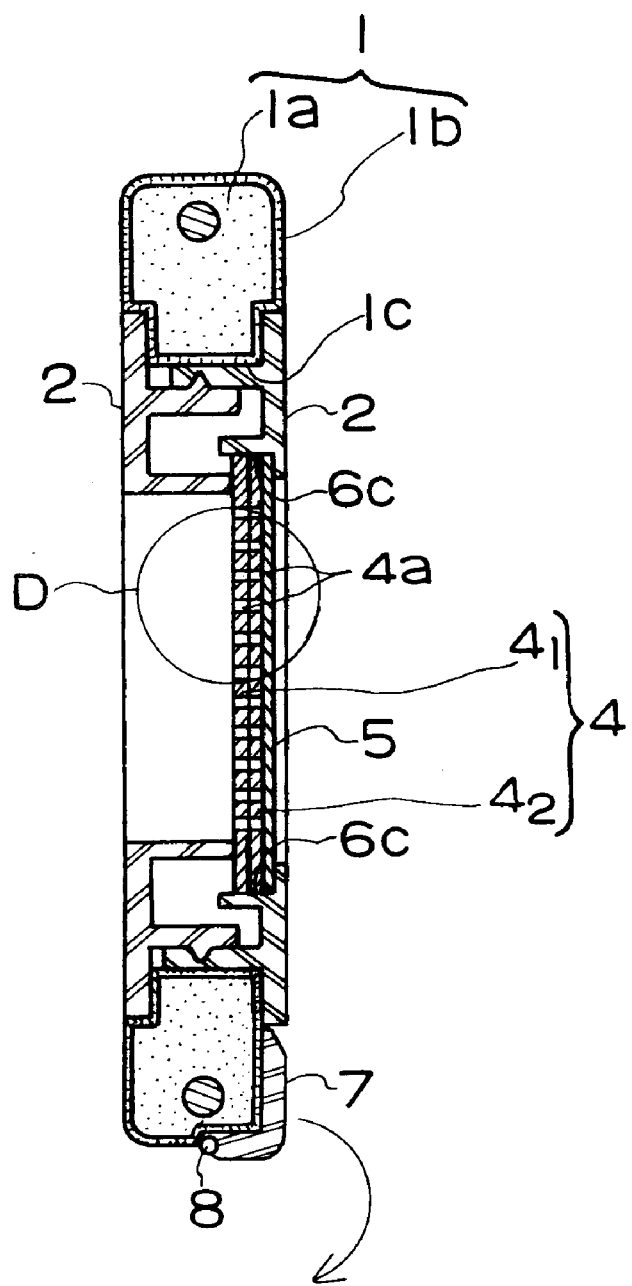
FIG. 11 is a cross sectional view along the line C—C in FIG. 10, showing the vehicle sun visor as the first preferred embodiment of the present invention.

FIG. 11 is a cross sectional view along the line C—C in FIG. 10. As shown in FIG. 11, the punched plate 4 and the light-attenuation plate 5 are layered together to make a light-shield assembly and sandwiched between the frame members 2 fitted in the opening 1c of the sun visor body 1. In this embodiment, the light-shield assembly is leaning to one side of the sun visor body 1.

Figure 12:
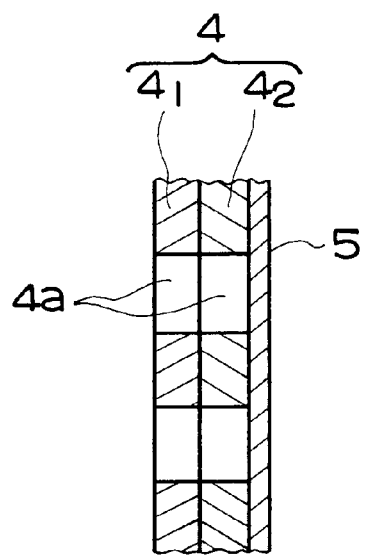
FIG. 12 is an enlarged view of a circled portion "D" in FIG. 11.
Figure 13:
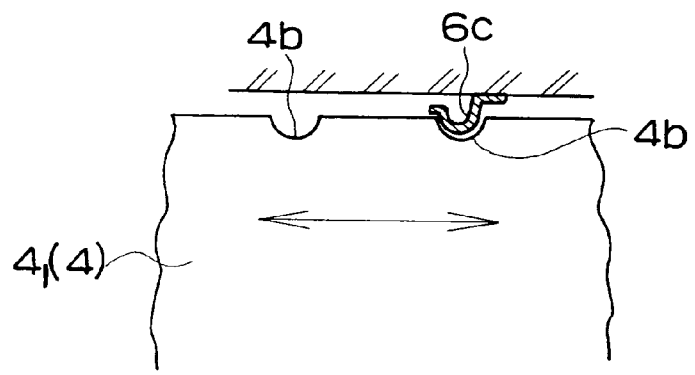
FIG. 13 is an enlarged view of an engaging means that interlocks the movable punched plate in a predetermined place.

The punched plate 4 consists of a plurality of punched sub-plates. In this embodiment, there are two sub-plates: a movable punched sub-plate (a first subplate) $4_1$ and a fixable punched sub-plate (a second sub-plate) $4_2$. Each of the subplates $4_1$, $4_2$ is formed by punching a plurality of holes 4a in a metal plate or the like to make a predetermined pattern of holes 4a. Each of the holes 4a is opened perpendicularly to both sides of the punched plate 4. The thickness of each sub-plates $4_1$, $4_2$, the diameter of each hole 4a, the spacing between the adjacent holes 4a, and so on are defined so that incident light obliquely from above is blocked, as discussed in a description of the first preferred embodiment. In addition, two sub-plates $4_1$, $4_2$ are arranged so that the holes 4a formed on the first sub-plate $4_1$ are coaxially aligned with the respective holes formed on the second sub-plate $4_2$ as shown in FIG. 12. The first sub-plate $4_1$ is able to slide in a lateral direction (i.e., toward the right and left ends of the sun visor body 1) with respect to the second sub-plate $4_2$. The first sub-plate $4_1$ is colored with black for preventing the reflection of light on the surface of the first subplate $4_1$.

The light-attenuation plate 5 is made of a colored synthetic resin plate referred to generally as "a smoke plate" and shaped with the same dimensions as that of the punched plate 4. The light-attenuation plate 5 is positioned at the back side (i.e., the driver's side) of the above light-shield assembly for attenuating light passing through the holes 4a of the punched plate 4.

The percentage of attenuating incident light by the light-attenuation plate 5 (or the light transmittance of the plate 5) is defined for reducing glare so that the incident light to be introduced into driver's eyes is not bright and the driver's front view is not obstructed by the incident light passing through both sub-plates $4_1$, $4_2$ of the punched plate 4.

The sliding member 6 is formed on one of right or left end portion of the sun visor body 1 and placed in a part of the frames 2. The sliding member 6 is able to slide the movable punched sub-plate (the first sub-plate) $4_1$ over the fixable punched sub-plate (the second sub-plate) $4_2$ in a lateral direction.

The sliding member 6 comprises an operating knob 6a facing to the driver's side, an operating rod 6b laterally elongated through the frame 2 facing to the driver's side and having one end connected to the operating knob 6a and the other end connected to a part of the movable punched sub-plate $4_1$, and an engaging means 6c made of a curved flat-spring to be engaged in one of notched portions 4b formed on the upper or lower edge of the movable punched sub-plate $4_1$ as shown in FIG. 12.

Moving the operating knob 6a in a lateral direction shifts the location of the movable punched sub-plate $4_1$ laterally with respect to the fixable punched subplate $4_2$, allowing the adjustment of the opening amount of each hole 4a to regulate the light amounts to be passed through the hole 4a or closing the hole 4a to prevent the passage of light perfectly.

In addition, the engagement between the engaging means 6c and one of the notches 4b prevents the movement of the movable punched sub-plate $4_1$ under the vibrations or the like during the operation of the vehicle.

Regarding such an engagement, furthermore, one of the notches 4b defines a first position where the movable punched sub-plate $4_1$ is located before the sliding movement and the other notch 4b defines a second position where the movable punched sub-plate $4_1$ is located after the sliding movement. In the first position, the holes 4b of the movable punched sub-plate $4_1$ may be coaxially communicated with their corresponding holes 4b of the fixable punched sub-plate $4_2$. In the second position, on the other hand, the holes 4a of the movable punched sub-plate $4_1$ may be displaced from their corresponding holes 4a of the fixable punched sub-plate $4_2$ with the predetermined amount of deviation from perfect alignment.

The pivoted lid 7 has a hinge 8 on its lower end. The hinge 8 pivotably connects the pivoted lid 7 to a lower end portion of the sun visor body 1 and allows the turn or pivot of the pivoted lid 7 around the hinge 8. The pivoted lid 7 is downwardly turned around the hinge 8 and extended as indicated by a broken line in FIG. 10, so that the sun visor can be provided as an extendable sun visor having an extended light-shielding area of the sun visor body 1.

Then, the usage and the effects of the sun visor described above will be now described in the follows.

Figure 14:
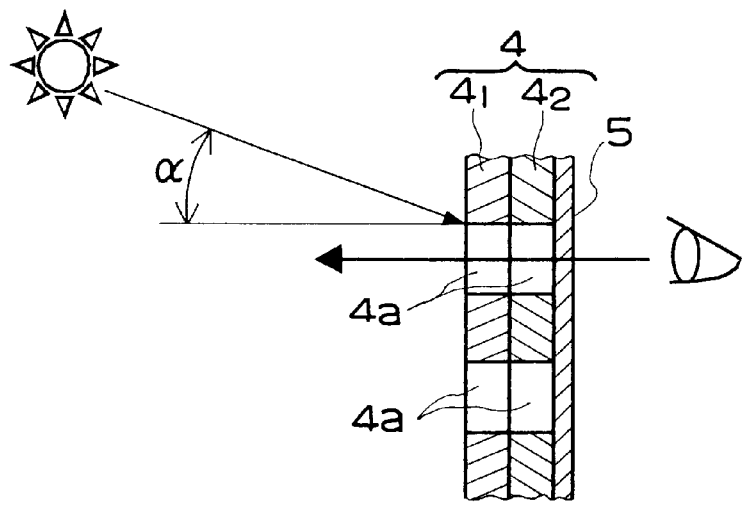
FIG. 14 is a cross sectional views of part of the sun visor of FIG. 10 for illustrating the mechanism of blocking sunlight incident obliquely from below in accordance with the second embodiment of the present invention.

If sunlight or the like is introduced obliquely from above into a driver's eye while the driver is driving the car, as shown in FIG. 14, the driver changes the orientation of the body 1 of the sun visor to place the surface of the body 1 substantially in a vertical direction with respect to a straight line of sight from the driver's eye indicated by the arrow in the figure. In other words, the sun visor is pivoted to the usage position. Therefore, the sunlight or the like incident obliquely from above at an angle of "α" with respect to the line of sight cannot pass through the holes 4a formed on the punched sub-plates $4_1$, $4_2$, so that the light incident obliquely from above can be effectively blocked while the driver's view toward the front can be ensured. Consequently, the driver is able to drive the car with safety in spite of using the sun visor to block sunlight or the like.

Figure 15:
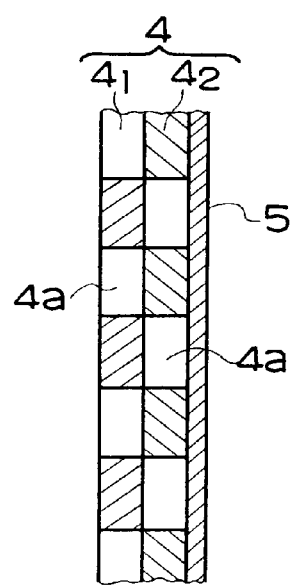
FIG. 15 is a cross sectional view of the sun visor of FIG. 14, in which the punched plates are displaced from each other.

If there is no need to keep the front view through the sun visor, the driver may laterally slide a slide knob 6a of the sliding member 6 to move the first sub-plate $4_1$ against the second sub-plate $4_2$ to close their holes 4a each other as shown in FIG. 15. In this case, the sub-plates $4_1$, $4_2$ close their holes 4a each other, so that incident light can be perfectly blocked. If there is a need to extend the light-shielding area of the sun visor body 1, the pivoted lid 7 can be downwardly turned to the position indicated by the broken line indicated in FIG. 10 to obtain a function as an extension sun visor.

If the incident light such as the evening sunlight is too strong and it is not sufficiently blocked by the light-attenuation plate 5, the amount of light to be passed through the holes 4a can be adjusted by slightly shifting the position of the first sub-plate $4_1$ to appropriately shield driver's eyes from the incident light. Thus, the incident light to be introduced into the driver's eyes is not bright and the driver's front view is not obstructed by the incident light passing through the light-attenuation plate 5. Therefore, the driver can drive the car without any troubles caused by the glare of incident light.

Figure 16:
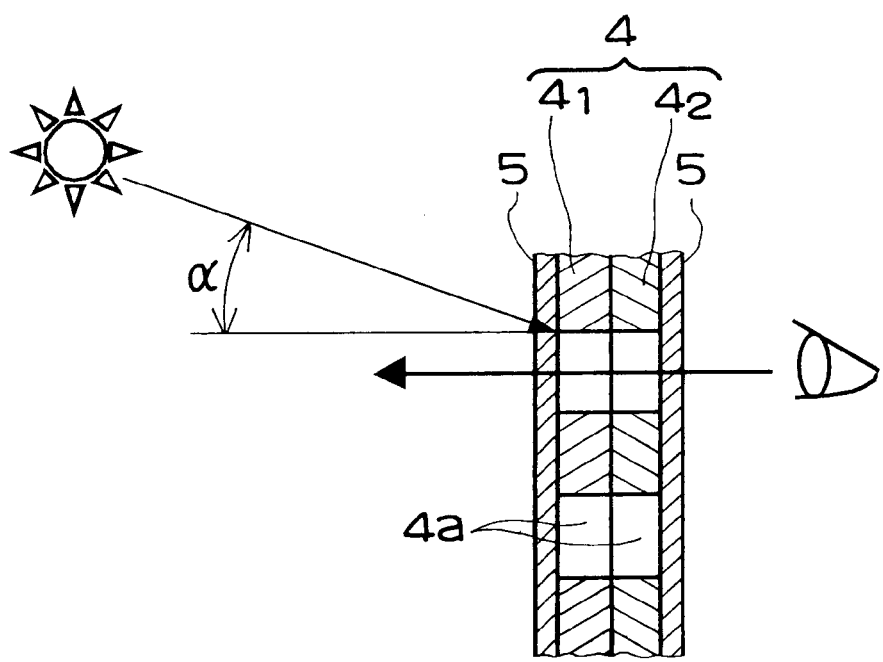
FIG. 16 is a cross sectional view of part of the sun visor of FIG. 10 for illustrating the mechanism of blocking sunlight incident obliquely from below in accordance with the second embodiment of the present invention.

In the above embodiment, the light-attenuation plate 5 is placed on the front or back side of the punched plate 4. However, in another embodiment, as shown in FIG. 16, the light-attenuation plates 5 may be placed on both sides of the punched plate 4 including the sub-plates $4_1$, $4_2$. For preventing excessive light-attenuation, in this case, the light-attenuation plate 5 is prepared to have a lower light-attenuation rate.

According to the present invention, as described above, the vehicle sun visor is configured so as to comprise a sun visor body having an opening; at least one punched plate having a front side and a back side and a plurality of holes opened between the front side and the back side, which is fitted in the opening of the sun visor body; and at least one light-attenuation plate for attenuating incident light passing through the holes of the punched plate, which is placed on at least one of the front side and the back side of the punched plate. Therefore, if sunlight or the like incident obliquely from above, it cannot pass through the holes of the punched plate. Thus, light incident obliquely from above can be effectively prevented without affecting the front view through the use of the light-attenuation plate and the holes of the punched plate. Accordingly, the driver can drive the vehicle safely when the sun visor is oriented in a light-shielding position.

In addition, incident light such as morning or evening sunlight horizontally passing through the punched plate can be attenuated by the light-attenuating plate, so that the incident light introduced into a driver's eye is not bright. Thus, the operation of the vehicle cannot be prevented by the incident light as the driver's front view is ensured by a combination of the holes of the punched plate and the light-attenuation plate. Accordingly, the driver can drive the vehicle safely when the sun visor is oriented in a light-shielding position.

According to the present invention, the light-attenuation plate may be a smoke plate made of a synthetic resin. Therefore, the smoke plate can be commercially available, so that the sun visor can be easily manufactured at a low cost, compared with the conventional one that uses a deflecting plate.

First and second punched plates may be provided on the front and back sides of the light-attenuation plate, respectively, by means of a printing procedure. Therefore, there is no need to provide punched plates as separate components, so that the number of components and the number of manufacturing steps can be reduced.

The holes of the first punched plate may be displaced from their corresponding holes of the second punched plate in a vertical direction of the sun visor body. By changing the orientation of the sun visor body, therefore, the horizontal or angled view can be easily obtained by pivoting or turning the sun visor body.

In another preferred embodiment of the present invention, the two or more punched plates may be stacked on top of each other in layers to form a punched plate assembly and at least one of the punched plates is provided as a movable punched plate whose position can be shifted by a sliding member, and the light-attenuating plate may be provided on at least one side of the punched plate assembly. Therefore, an advantage of the present invention is that sunlight or the like incident obliquely from above cannot pass through the holes of the punched plates, so that such light can be effectively prevented without affecting the front view through a combination of the light-attenuation plate and the holes of the punched plate. In addition, incident light such as morning or evening sunlight horizontally passing through the punched plates can be attenuated by the light-attenuating plate, so that the incident light introduced into driver's eyes is not bright. Furthermore, the position of the movable punched plate can be shifted by the sliding member for adjusting the degree of opening the holes or closing the holes perfectly when the intensity of incident light is too high or the front view is not required.

According to the present invention, an engaging member may be further comprised in the sun visor for interlocking the movable punched plate on different predetermined positions before and after the sliding movement of, the movable punched plate, respectively. Therefore, there is no possibility of accidentally moving the movable punched plate by mechanical vibrations or the like to be caused by driving a vehicle, so that the movable punched plate can be kept in place as desired by a driver.

According to the present invention, a pivoted lid may be further comprised in the sun visor, which may be fixed on the lower part of the sun visor body by means of a hinge so that the pivoted lid is able to turn around the hinge. For extending the shield area of the sun visor body, therefore, the pivoted lid can be extended from the sun visor body by turning around the hinge, so that the sun visor can be functioned as an extension sun visor.

According to the present invention, a rod member may be further comprised in the sun visor for attaching the sun visor on a predetermined portion of a vehicle, where the sun visor is able to turn around the rod member. Therefore, the sun visor body can be pivoted around the rod member, so that the sun visor can be easily oriented in a position as desired.

The present invention has been described in detail with respect to preferred embodiments, and it will now be obvious to those skilled in the art that changes and modifications may be made without departing from the invention in its broader aspects, and it is the intention, therefore, in the appended claims to cover all such changes and modifications as fall within the true spirit of the invention.

What is claimed is:

1. A vehicle sun visor comprising:
   a sun visor body having an opening;
   a punched plate having a plurality of holes opened therethrough, which is placed in the opening of the sun visor body; and
   a light-attenuation plate for attenuating incident light passing through the holes of the punched plate, which is placed on at least one of a front side and a back side of the punched plate,
   wherein at least one of said plurality of holes is configured to substantially prevent the passage of incident light that enters said at least one of said plurality of holes with respect to an axis of said at least one of said plurality of holes at any angle a greater than a critical angle.

2. The vehicle sun visor as claimed in claim 1, wherein the light-attenuation plate is a smoke plate made of a synthetic resin.

3. The vehicle sun visor as claimed in claim 1, further comprising:
   a sliding member, wherein
      two or more punched plates are stacked on top of each other in layers to form a punched plate assembly and at least one of the punched plates is provided as a movable punched plate whose position can be shifted by the sliding member, and
      the light-attenuation plate is provided on at least one side of the punched plate assembly.

4. The vehicle sun visor as claimed in claim 3, wherein the light-attenuation plate is a smoke plate made of a synthetic resin.

5. The vehicle sun visor as claimed in claim 4, further comprising:
   an engaging member for interlocking the movable punched plate on different predetermined positions before and after the sliding movement of the movable punched plate, respectively.

6. The vehicle sun visor as claimed in claim 4, further comprising:
   a pivoted lid which is fixed on the lower part of the sun visor body by means of a hinge so that the pivoted lid is able to turn around the hinge.

7. The vehicle sun visor as claimed in claim 5, further comprising:
   a pivoted lid which is fixed on the lower part of the sun visor body by means of a hinge so that the pivoted lid is able to turn around the hinge.

8. The vehicle sun visor as claimed in claim 4, further comprising:
   an engaging member for interlocking the movable punched plate on different predetermined positions before and after the sliding movement of the movable punched plate, respectively.

9. The vehicle sun visor as claimed in claim 4, further comprising:
   a pivoted lid which is fixed on the lower part of the sun visor body by means of a hinge so that the pivoted lid is able to turn around the hinge.

10. A vehicle sun visor as in claim 1, wherein said critical angle is substantially equal to or less than 38.7°.

11. A vehicle sun visor as in claim 10, wherein said critical angle is substantially equal to or greater than 21.8°.

12. A vehicle sun visor as in claim 10, wherein said critical angle is substantially equal to or greater than 11.3°.

13. The vehicle sun visor as in claim 1, wherein a thickness of said punched plate is substantially equal to or greater than 2 mm.

14. A vehicle sun visor comprising:
   a sun visor body having an opening;
   a punched plate having a plurality of holes opened therethrough, which is placed in the opening of the sun visor body; and
   a light-attenuation plate for attenuating incident light passing through the holes of the punched plate, which is placed on at least one of a front side and a back side of the punched plate,
   wherein said visor is configured to substantially prevent the passage of incident light that enters said visor with respect to an axis normal to a surface of said visor at any angle $\alpha$ greater than a critical angle, and
   wherein said critical angle is substantially equal to or less than 38.7°.

15. A vehicle sun visor comprising:
   a sun visor body having an opening;
   at least two punched plates, each having a plurality of holes opened therethrough, placed in the opening of the sun visor body;
   a light-attenuation plate for attenuating incident light passing through the holes of the punched plates, which is placed on at least one side of at least one of the punched plates; and
   a sliding member,
   wherein at least one of the punched plates is provided as a movable punched plate whose position can be shifted by the sliding member, and
   wherein a movement of the movable punched plate with respect to the sun visor is limited.

16. The vehicle sun visor as in claim 15, wherein said visor is configured to substantially prevent the passage of incident light that enters said visor with respect to an axis normal to a surface of said visor at any angle $\alpha$ greater than a critical angle, and wherein said critical angle is substantially equal to or less than 38.7°.

* * * * *